United States Patent [19]

Krause

[11] Patent Number: 4,780,002
[45] Date of Patent: Oct. 25, 1988

[54] BEARING FOR LAWN TRIMMER CUTTER HEAD

[75] Inventor: Richard T. Krause, Hendersonville, N.C.

[73] Assignee: Avco Corporation, Providence, R.I.

[21] Appl. No.: 4,557

[22] Filed: Jan. 20, 1987

[51] Int. Cl.⁴ .................. F16C 33/10; F16C 33/18; A01D 35/26
[52] U.S. Cl. .................................. 384/322; 56/12.7; 384/279
[58] Field of Search ............... 384/129, 279, 286, 322, 384/397, 428, 438, 441, 462, 469, 474, 537, 541, 584, 585, 902, 903; 56/12.7; 30/276

[56] References Cited

U.S. PATENT DOCUMENTS

| | | |
|---|---|---|
| 2,035,519 | 3/1936 | Apple .................................. 384/279 |
| 2,293,313 | 8/1942 | Sladky ............................ 384/322 X |
| 2,800,373 | 7/1957 | Kablick et al. .................. 384/279 X |
| 4,148,141 | 8/1979 | Hoff ................................ 56/12.7 X |
| 4,226,021 | 10/1980 | Hoff ................................ 56/12.7 X |
| 4,451,983 | 6/1984 | Johnson et al. .................. 56/12.7 X |
| 4,476,632 | 10/1984 | Prouly ............................. 56/12.7 X |

Primary Examiner—John Petrakes
Assistant Examiner—Thomas R. Hannon
Attorney, Agent, or Firm—Abraham Ogman

[57] ABSTRACT

A bearing assembly is disclosed which is useful in mounting the cutter head of a lawn trimming implement to the tubular casing extending forward and downward from the power head. A flexible shaft housed within the tubular casing conveys rotary motion from the power head to the bearing assembly which comprises a short tubular bearing housing within which is a pair of spaced apart bearings. A central bore through the bearings is sized to accept the first end of a drive connector shaft. Within the tubular bearing housing and between the bearings is a lubricant holding annular felt ring. Adjacent the first end of the drive connector shaft is an annular slot which allows the shaft to be secured in the tubular bearing housing by a C-clip keeper. The midsection of the tubular bearing housing has an enlarged diameter as compared to the end sections which contain the bearings. As a result, when the bearing assembly is installed by press fitting it into the end of the tubular casing there will be no resulting compressive force exerted on the bearings. When the bearing assembly is locked in place within the tubular bearing housing, rotary motion from the flexible shaft is communicated through the drive connector shaft to the rotary cutter head which attaches to the second end thereof. Torque is conveyed to the hub section of the cutter head by means of a hexagonal shoulder integrally formed on the shaft.

5 Claims, 1 Drawing Sheet

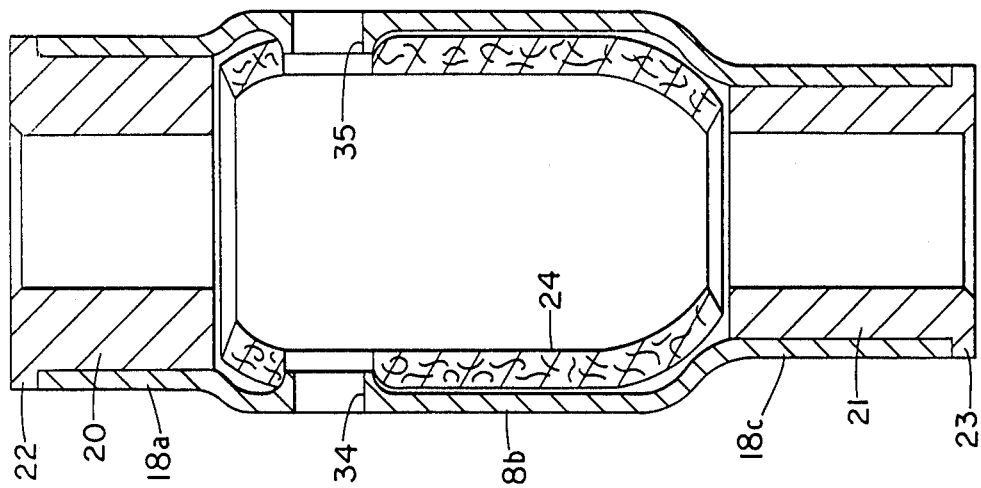
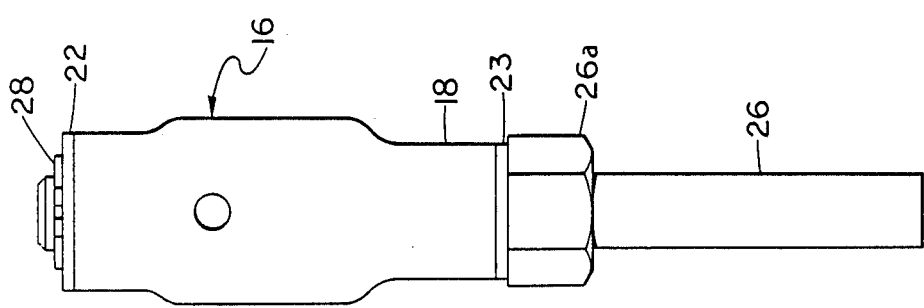
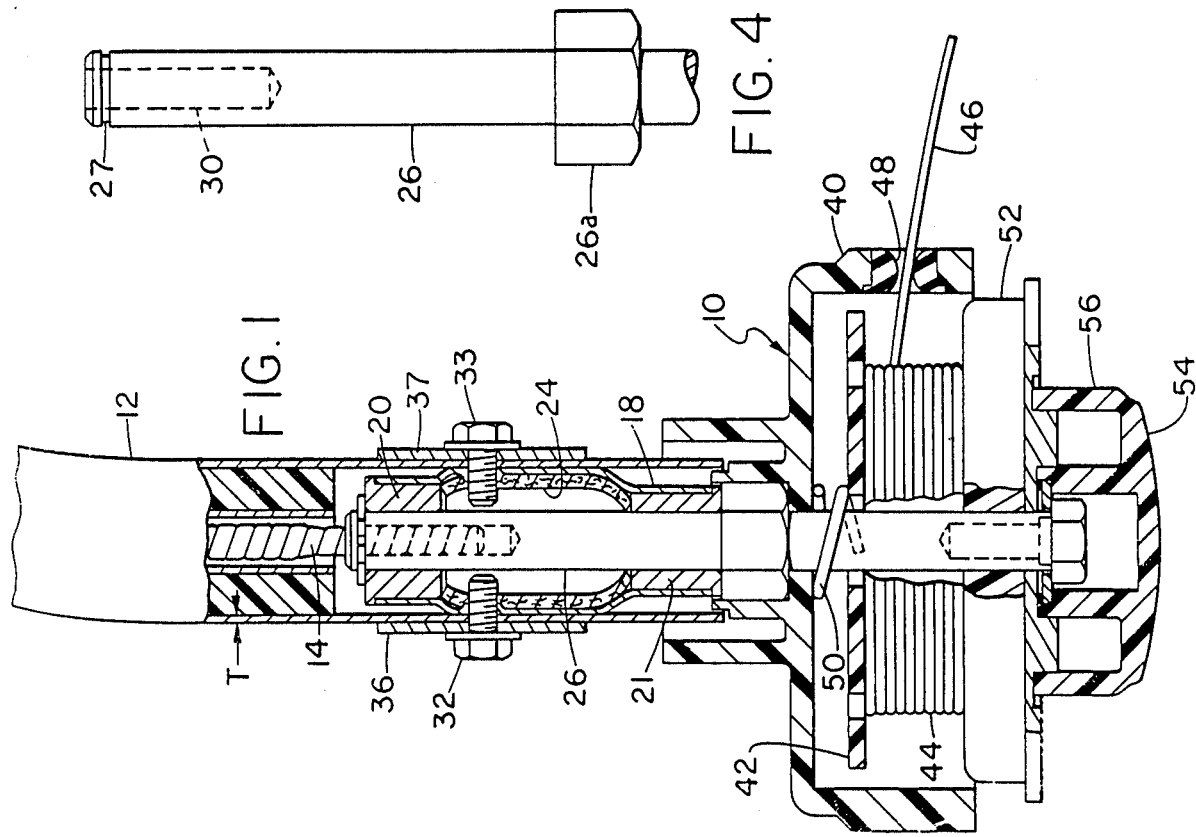

BEARING FOR LAWN TRIMMER CUTTER HEAD

BACKGROUND OF THE INVENTION

This invention relates to the bearing assembly for mounting a rotary cutter head to the support shaft of a string trimmer implement.

There are a number of lawn trimming, edging and turf clearing implements currently on the market. The mounting shaft bearings for these prior art units are exemplified by U.S. Pats. Nos. 4,148,141 and 4,476,632. U.S. Pat. No. 4,148,141 to Hoff (see FIG. 2 and column 2, lines 44–56) describe a driven arbor shaft which rotates the cutter hub. The arbor shaft is supported for rotation by two ball bearings. The ball bearings are positioned within an enlarged end section of the shaft housing. Spacers are used between the bearings and the housing is crimped over the outer end of the lower ball bearing.

The U.S. Pat. No. to Proulx (4,476,632) describes a string trimmer wherein the cutter head is supported on the end of a shaft by a die cast or machined bearing housing. Bronze bushings are used and the bearing housing is clamped to the end of the shaft.

The U.S. Pat. No. to Fingerle et al (4,472,004) describes an approach for lubricating spaced apart bearings which support a spinning shaft. Interposed between the bearings and surrounding the shaft is a sleeve in the form of a tubular member provided with a capillary channel through which lubricant is delivered to the bearings.

My invention provides an improved string trimmer bearing assembly which is of relatively simple and inexpensive construction, assures optimal use of the lubricant supply and requires little maintenance.

SUMMARY OF THE INVENTION

According to the present invention a bearing assembly is provided which supports the rotary cutting head of a string trimmer. The bearing assembly includes a short tubular bearing housing that is slightly more than two inches long. The end sections of the tubular bearing housing are at least 0.050 in. less than the diameter of the midsection. A pair of bronze bearings are pressed into the ends of the tubular bearing housing. The outermost ends of the bronze bearings have shoulders which seat against the ends of the tubular bearing housing. A central bore through each bronze bearing is sized to accept a drive connector shaft. The drive connector shaft, which may be some 4.5 inches long, has an integrally formed shoulder of hexagonal cross section near its midpoint. Beyond the shoulder, the shat is of circular cross section in both directions. The diameter and length in the first direction is sized to pass through the tubular bearing housing with bearings inserted therein. The shaft extends beyond the tubular bearing housing sufficiently to enable a C - clip to be slipped transversely into an annular slot formed adjacent the end of the shaft. In this way the tubular bearing housing is captured on the first end of the drive connector shaft. The outermost end of the drive connector shaft, that portion beyond the C - clip, has an opening of generally square cross section formed axially therein, as by broaching.

Within the tubular bearing housing in the region between the bronze bushings there is a ring of lubricant absorbing material surrounding the drive connector shaft. When soaked with lubricant during assembly, this annular ring of absorbing material continues to furnish lubricant to the bronze bushings during many months of use.

The bearing assembly comprising the tubular bearing housing, bronze bushings and drive connector shaft is now ready for insertion into the lower end of the support shaft which serves both as a guide tube for the flexible shaft connected to a drive motor and as a handle by which the user operates the string trimmer. The tubular housing portion of the bearing assembly can be pressed into the lower end of the tubular support casing. A substantial press fit of as much as 0.030 inch can be accomodated due to the fact that the midsection of the tubular bearing housing has a diameter which is larger than the end sections which hold the bronze bushings. By using a barrel shaped tubular bearing housing, compressive pressure on the periphery of the bronze bearings is avoided. Compressive pressure on the periphery of the bearings will cause them to tighten up on the drive connector shaft causing overheating and excessive power drain.

By forming the tubular bearing housing out of material whose wall thickness approximates that of the receiving tube of the support casing, the compressive and tension forces will be approximately in balance and the tubular support casing will continue to grip the tubular bearing housing. As a safety measure, however, a pair of screws are used to properly position and lock the bearing assembly in place within the lower end of the support casing. When in place the output end of the flexible shaft connected to the drive motor will enter and nest within the opening broached into the axis of the drive connector shaft.

The rotary cutter head of the lawn trimmer is then mounted on the protruding second end of the drive connector shaft. The cutter head comprises a body having the general configuration of an inverted shallow cup. The cup includes a hub having a central bore of hexagonal cross section sized to receive the shoulder portion of the drive connector shaft. Coaxially mounted within the inverted shallow cup portion of the cutter head is the trimmer line containing a supply spool together with the line advancement mechanism. These components are physically secured to the protruding second end of the drive connector shaft by a bolt and washer secured to the lower end of the shaft.

IN THE DRAWINGS

FIG. 1 is an axial cross sectional view of a cutter head mounted via the bearing assembly of this invention to the lower end of the tubular shaft of the lawn trimming implement.

FIG. 2 is a side view of the bearing assembly.

FIG. 3 is a cross sectional view of the tubular housing with bronze bearings inserted therein and including the lubricant filled annular shaped felt material.

FIG. 4 is a side view of the upper portion of the drive connector shaft.

DESCRIPTION OF THE PREFERRED EMBODIMENT

FIG. 1 shows a cutter head 10 mounted via the bearing assembly of this invention to the lower end of tubular casing 12 which extends forward and downward from the power head (not shown) of a lawn trimming implement. The power head in most implementations will comprise a lightweight gasoline powered reciprocating engine which drives the cutter head via flexible drive shaft 14 housed within tubular casing 12. Interposed between flexible drive shaft 14 and cutter head 10 is bearing assembly 16 shown enlarged in FIG. 2.

Bearing assembly 16 includes a tubular bearing housing 18 formed of a material whose wall thickness approximates that of the receiving tube of tubular casing 12 (see dimension T). Tubular bearing housing 18 in the system reduced to practice was deep-drawn metal stamping. The end sections of tubular bearing housing 18 are sized so as to have diameters which are smaller than the central portion (see also the doubly enlarged view in FIG. 3 where end sections 18a and 18c have diameters smaller than central portion 18b). Bronze bearings 20 and 21 are pressed into the upper and lower ends, respectively, of tubular bearing housing 18. The outermost ends of these bearings have shoulders 22 and 23 formed thereon which abut the ends of the tubular bearing housing 18 when the bronze bearings are pressed into place.

Within tubular bearing housing 18 in the region between bronze bushings 20 and 21 is an annular ring of lubricant absorbing felt 24. The annular ring of felt 24 is sized to hug the inside surface of tubular bearing housing 18. During assembly the bronze bearings are impregnated with lubricant and the ring of felt 24 thoroughly saturated with lubricant. As a result the bushings continue to be supplied with fresh lubricant over a long period of trimmer use.

The central bore through the upper and lower bronze bushings are in axial alignment and sized to accept drive connector shaft 26. In the unit reduced to practice drive connector shaft 26 was milled from a rod of hexagonal stock. This made it possible to obtain a drive connector shaft 26 having an integrally formed shoulder 26a of hexagonal cross section near the shaft midpoint (see also FIG. 4). Beyond shoulder 26a, the shaft is of circular cross section in both directions. The diameter and length in the first direction is such that it passes through the tubular bearing housing with bearings inserted (see FIG. 3) and extends sufficiently beyond to expose annular slot 27 (see FIG. 4). A C-clip 28 is pressed into slot 27 to secure drive connector shaft 26 into the housing. The outermost end of the drive connector shaft, in other words the end beyond annular slot 27, has an opening 30 of generally square cross section formed axially therein, as by broaching.

The bearing assembly comprising tubular bearing housing 18, bronze bushings 20 and 21, drive connector shaft 26 and C-clip 28 is now ready for insertion into the lower end of tubular casing 12 (see FIG. 1) which serves as a guide tube for flexible shaft 14. It will be noted in Fig. 1 that the tip end of flexible shaft 14 is compressed to conform to the rectangular opening in the first end of drive connector shaft 26. The tubular bearing housing portion of the bearing assembly can be pressed into the lower end of the support shaft. A substantial press fit of as much as 0.030 inch can be accomodated due to the fact that the midsection 18b of the tubular bearing housing has a diameter which is larger than the end sections which hold the bronze bushings. By using a barrel shaped tubular bearing housing as shown in FIG. 3 compressive pressure on the periphery of the bronze bearings is avoided. Compressive pressure on the periphery of the bearings will cause them to tighten up on the drive connector shaft causing overheating and excessive wear will result.

As mentioned earlier, the wall thickness of tubular bearing housing 18 approximates that of the receiving tube of tubular casing 12. As a result the compressive forces on the midsection of tubular bearing housing 18 will be approximately in balance with the tension forces exerted on tubular casing 12. This balance will prevent stretching of the end portion of the tubular casing and as a result the grip on tubular bearing housing 18 will continue during the life of the implement. However, as a safety measure, a pair of screws 32 and 33 are used to properly position and lock bearing assembly 16 in place within the lower end of tubular casing 12. When in place as shown in FIG. 1, the output end of flexible shaft 14 will nest within the opening broached into the first end of drive connector shaft 26.

As depicted in FIGS. 1, 2 and 3 screws 32 and 33 penetrate radially through the walls of tubular casing 12 so as to engage threaded openings 34 and 35, respectively, formed in tubular bearing housing 18. Spacer support washers 36 and 37 provide added structural support. As an enhancement to service life it will be noted that either of the screws 32 and 33 can be removed and a fresh supply of lubricant squirted into the cavity within bearing assembly 16.

With the bearing assembly in position as shown in FIG. 1, the rotary cutter head of the lawn trimmer is then mounted on the protruding second end of drive connector shaft 26. The cutter head includes a body 40 having the general configuration of an inverted shallow cup. The cup includes a hub having a central bore of hexagonal cross section sized to receive shoulder portion 26a of the drive connector shaft. Coaxially mounted within cup shaped body 40 is the drum portion of spool 42 which receives winding 44 of cutting line 46. Cutting line 46 passes through grommet 48 which is set in the skirt section of cup shaped body 40. Between the top of spool 42 and the underside of cup shaped body 40 is a spring 50 which together with string advancement mechanism 52 steps cutting line 46 incrementally out through grommet 48 as wear and breakage occur. The entire complement of cutter head components are held in position on the downward extending second end of drive connector shaft 26 by machine screw 54. A cap member 56 completes the assembly.

While there has been shown and described what is at present considered to be the preferred embodiment of the invention, it will be obvious to those skilled in the art that various changes and modifications may be made therein without departing from the true scope of the invention as defined in the appended claims.

I claim:

1. A bearing assembly for mounting a rotary cutter head to the end of a flexible shaft supported in an elongated tubular casing, said bearing assembly comprising:
   a tubular bearing housing, the end sections of said bearing housing having outside diameters less than the outside diameter of its midsection;
   two spaced bearings mounted within said tubular bearing housing, one of said bearings being pressed into each end section of said tubular bearing housing, said bearings having coaxially aligned central bores;
   a drive connector shaft extending through said housing and supported by said spaced bearings, said drive connector shaft having means thereon for axially fixing said shaft within said housing, one end of said drive connector shaft having means for coupling to said flexible shaft, the other end of said drive connector shaft being connectable to said rotary cutter head;

an annular ring of lubricant absorbing material positioned within said tubular bearing housing in the region between said pair of bearings; and said tubular bearing housing being positioned in the end of said elongated tubular casing, the midsection of said housing being compressed therein, the end sections being slightly spaced from the interior of said casing.

2. The bearing assembly as defined in claim 1 and having an opening in the sidewall of said tubular bearing housing for supplying fresh quantities of oil to the bearings mounted therein.

3. The bearing assembly as defined in claim 1 wherein the relative diameters of the tubular bearing housing and the inside of the tubular casing are sized such that there is an interference fit only with the midsection of said tubular bearing housing thus precluding compressive forces being applied to the bearing carrying end sections.

4. The bearing assembly as defined in claim 1 wherein the tubular bearing housing is formed from stock of approximately the same thickness as the sidewalls of the tubular casing.

5. A bearing assembly for mounting a rotary cutter head to the lower end of a tubular casing extending forward and downward from the power head of a lawn trimming implement wherein the power head supplies energy via a flexible drive shaft having a non-round cross end housed within said tubular casing, the bearing assembly comprising:

a tubular bearing housing having end sections with diameters at least 0.050 inch less than the outside diameter of the midsection region;

a pair of bearings mounted in spaced arrangement within said tubular bearing housing, one of said bearings being pressed into each end section of said tubular housing, said pair of bearings having coaxially aligned central bores;

a drive connector shaft having near its midpoint a shoulder of non-round cross section, said drive connector shaft having an annular slot adjacent its first end, the diameter and length of said shaft between said shoulder and said first end being sized to pass through said tubular bearing housing with bearings inserted therein, said first end of said drive connector shaft having an opening complementing said non-round end formed axially therein, the distance between said shoulder and the second end of said drive connector being sized for mounting said cutter head thereon;

an annular ring of lubricant absorbing material inserted within said tubular housing in the region between said pair of bearings, said lubricant material being arranged to surround said drive connector shaft;

clip means for securing said said first end of said drive connector shaft in said tubular bearing housing;

said midsection being sized to fit within the lower end of said tubular bearing housing with a press fit for securing said tubular bearing housing with said drive connector shaft in place into the lower end of said tubular casing and with said non-round end within the non-rounding opening, for locking said flexible drive shaft to the first end of said drive connector shaft for communicating rotary motion from said power head; and mounting means for attaching said cutter head to the second end of said drive connector shaft, said second mounting means including means for communicating rotary motion from said shoulder of non-round cross section to said cutter head

* * * * *